VARIABLE INDUCTOR CONTROLLED SERVOSYSTEM

Filed Aug. 29, 1960 3 Sheets-Sheet 1

INVENTOR.
JERZY H. ZDZIEBORSKI
BY
Eugene C. Knoblock
ATTORNEY

INVENTOR.
JERZY H. ZDZIEBORSKI
BY
Eugene C. Knoblock
ATTORNEY

INVENTOR.
JERZY H. ZDZIEBORSKI
BY
Eugene C. Knoblock
ATTORNEY

United States Patent Office 3,015,053

Patented Dec. 26, 1961

3,015,053

VARIABLE INDUCTOR CONTROLLED SERVOSYSTEM

Jerzy H. Zdzieborski, Michigan City, Ind., assignor to The Hays Corporation, Michigan City, Ind., a corporation of Indiana Filed Aug. 29, 1960, Ser. No. 52,440

19 Claims. (Cl. 318—28)

This invention relates to a signal transmission system usable for recording or control purposes, and particularly for the transmission of information regarding variations in a position, a condition or other variable from a transmitting station to a receiving station located at a distance from the transmitting station.

Heretofore it has been customary in systems of this character to use a four-wire circuit between the transmitting unit and the receiving unit, or in some instances, such as in the system shown in Wilson Patent No. 2,692,357, dated October 19, 1954, it has been possible to utilize only three wires in such a system. The need for use of three or four transmission lines of limited resistance has generally limited the use of such systems to operate over relatively short transmission distances. Likewise, the need for three or four transmission lines has excluded the use of telephone lines.

It is the primary object of this invention to provide an efficient, accurate, sensitive signal transmission system which utilizes only two wires extending between a transmitting station and a receiving station.

A further object is to provide a system which is independent of variations in supply voltage.

A further object is to provide a system which can operate with lines of any desired length and of any desired resistance, and which can be adjusted easily and quickly to compensate for and to accommodate line resistance and line length.

A further object is to provide a system of this character employing rectifiers which operates above the threshold level of the rectifiers and thus avoids dead spots in the response characteristics of the system.

A further object is to provide a system of this character which can be either completely independent of response to transmission line ambient temperature effects or which has only negligible response to variation in ambient temperature.

A further object is to provide a system of this character which, when in balance, is independent of variations in ambient temperature at both the transmitting and the receiving stations.

A further object is to provide a system of this character in which each of the transmitter and receiver units consists of two coils wound upon the same bobbin and connected in series within the influence of a shiftable magnetic core and two rectifiers connected in series with the coils to control the direction of current flow in said coils.

A further object is to provide a system of this character having an alternating current input wherein the system operates when unbalanced to produce an output in the nature of a pulsating direct current.

A further object is to provide a system in which transmitter and receiver coils have relatively high impedance compared to transmission line resistance, so that changes in transmission line resistance due to change in ambient temperature can be held to a second order effect.

A further object is to provide a system of this character usable with a servo unit for the purpose of automatically restoring the system to balance upon any unbalance thereof resulting from variations of the position, condition, or other variable being measured at the transmitting station.

Other objects will be apparent from the following specification.

Figures 1, 2:
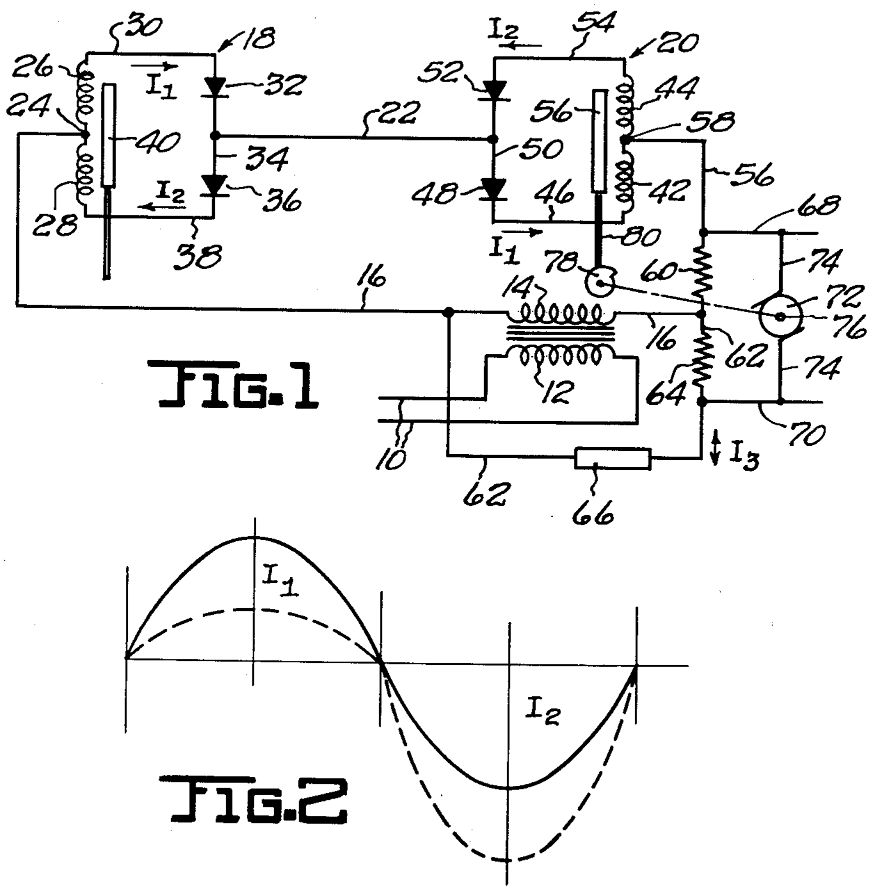
FIG. 1 is a schematic or diagrammatic illustration of one embodiment of the system.
FIG. 2 illustrates in full lines the symmetrical wave form of the output of the system when the system is in balance, and illustrating in dotted lines a wave form resulting from lack of balance between the transmitting and receiving stations.
Figure 3:
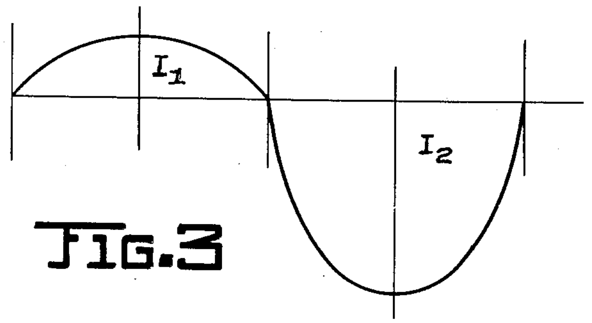
FIG. 3 illustrates a wave form resulting from lack of balance of the system.

Referring to the drawings, and particularly to FIG. 1, the numeral 10 designates an alternating current power supply line having connected therein the primary winding 12 of a transformer having a secondary winding 14 which is interposed in a transmission line 16 extending between a transmitting station 18 and a receiving station 20, which stations are also connected by a second transmission line 22.

Transmission line 16 is connected to a transmitting unit 18 at a center tap 24 between a pair of similar induction coils 26 and 28 which preferably are wound upon the same bobbin and are connected together in series. A lead 30 extends from coil 26 to a rectifier 32 which is connected by a lead 34 in series with a second rectifier 36 which in turn is connected by lead 38 with the coil 28. The rectifier 32 permits the flow of current in lead 30 only from the coil 26 to rectifier 32. The rectifier 36 permits flow of current in the lead 38 only from the rectifier 36 toward the coil 28. A magnetic core 40 is juxtaposed to the two coils 26 and 28 and, in normal or neutral position, will equally influence the coils 26 and 28. The armature 40 will be connected to means (not shown) which is responsive to a state, condition or position, which is subject to variation. For example, the position of the armature 40 may respond to the variations of level of a float upon a liquid body or may be responsive to variations of a thermal sensitive member or of a pressure sensitive member, as well understood in the art.

The transmission line 22 branches from lead 34 of the transmitting unit between the rectifiers 32 and 36 and extends to a receiving unit 20 which matches the transmitting unit 18. The receiving unit 20 includes a loop circuit in which coils 42 and 44, similar to each other and to the coils 26 and 28, are wound upon a common bobbin and connected in series. Lead 46 extends from coil 42 to a rectifier 48 which in turn is connected by lead 50 in series with a second rectifier 52 which in turn is connected by a lead 54 in series with coil 44. Transmission line 22 is connected to lead 50 of the receiving unit between the rectifiers 52 and 48. Rectifier 48 permits flow in lead 46 only toward the coil 42, and rectifier 52 permits current to flow in lead 54 only from the coil 46 to said rectifier 52. A magnetic armature 56, similar to armature 40, is shiftable relative to coils 42 and 44.

Transmission line 16 is connected by a lead 56 with the receiving unit 20 at a center tap 58 between the coils 42 and 44. Lead 56 has a resistor 60 interposed therein. A lead 62 is connected to the transmission line 16 in shunt relation to secondary coil 14 of the transformer and has a resistor 64 interposed therein which is preferably similar to the resistor 60. Shunt circuit 62 also has a reference impedance 66 interposed therein and may be variable or adjustable. Output leads 68 and 70 are connected with the leads 56 and 62, respectively. Output lead 68 is connected between resistor 60 and tap 58 to the receiving unit 20, and output lead 70 is connected between the resistor 64 and the reference impedance 66.

The device is preferably provided with a servo mechanism responsive to the current in the output leads 68 and 70. As shown in FIG. 1, this servo mechanism may include a reversible motor 72 connected across the outlet leads 68 and 70 by conductor 74. The shaft 76 of the motor 72 may mount a cam 78 engaging a plunger 80 projecting from the armature 56.

In the installation of the transmission system, the resistance of the transmission lines 16 and 22 will preferably be calculated, and the reference impedance 66 will be chosen or adjusted to normally balance that transmission line resistance. Also, the system will be initially balanced with the magnetic core 40 located in center position with respect to the coils 26, 28 of the transmitting unit and the magnetic core centered relative to the coils 42 and 44 of the receiving unit 20. When the system is balanced, current $I_1$ which flows through coil 26, rectifier 32, transmission line 22, rectifier 48 and coil 42 is equal to and is the same as current $I_2$ flowing through coil 44, rectifier 52, transmission line 22, rectifier 36 and coil 28. Since the impedance of the respective coils 26, 28, 42 and 44 are equal, it will be apparent that the sum of the impedances of coils 26 and 42 is the same as the sum of the impedances of coils 28 and 44. Consequently, in the balanced condition of the system the resultant current flowing in the system is a symmetrical wave form, as shown in full lines in FIG. 2.

When a change occurs in the condition, state or position to which the transmitter 18 responds, of a nature to cause a movement of the armature 40 in the direction of the coil 26, the impedance of coil 26 of the transmitter increases, causing current $I_1$ to decrease. At the same time the impedance of coil 28 decreases, causing current $I_2$ to increase. The resulting current flowing in the transmitter produces a variation in the signal wave form to the non-symmetrical wave type illustrated in dotted lines in FIG. 2 and in full lines in FIG. 2. The unsymmetrical signal wave form or condition will exist in the system until the core 56 of the receiver 20 is moved in the direction of the coil 42 to the proper extent to increase the impedance of the coil 42 to match that of the coil 26 and to decrease the impedance of the coil 44 to match that of the coil 28. At the new impedance-matching position of the armature 56, the resulting signal current will again be symmetrical, as shown in full lines in FIG. 2.

Figure 4:
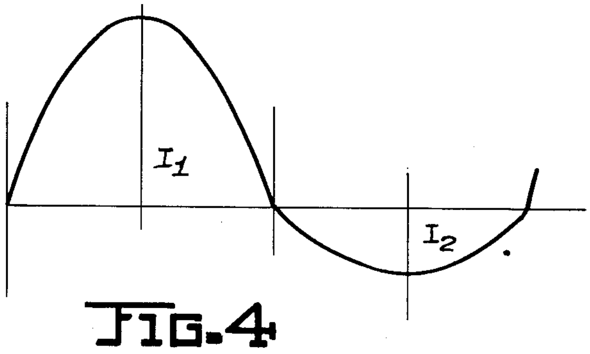
FIG. 4 illustrates another wave form resulting from an unbalance condition in the system.

Movement of the transmitter core 40, in response to the condition, state or position being measured, in the direction of the coil 28 will have substantially the same effect described above except that the impedance of coil 28 will increase and the impedance of coil 26 will decrease so that the current $I_1$ will increase and $I_2$ will decrease. This will produce an unsymmetrical wave form, for example, as illustrated in FIG. 4. A balanced wave form can be restored in the same manner as explained previously by moving the receiver coil 56 in a direction and to an extent to again restore to equality the sum of the impedances 26 and 42 with the sum of the impedances 28 and 44.

Figure 5:
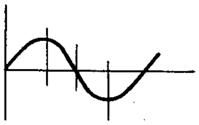
FIGS. 5, 6 and 7 illustrate the outputs of the system at different points thereof when the system is in balance.
Figure 6:
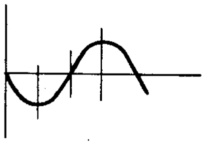
Figure 7:
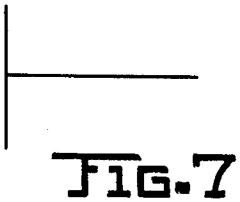

Measurement of the unbalance of the system, if any, is made across the resistors 60 and 64, that is, at the output leads 68 and 70. When the system is at balance the voltage drop across resistance 60 is the same as the voltage drop across the resistance 64, but is of opposite phase, so that the resulting output is zero. This balanced condition is illustrated in FIGS. 5, 6 and 7. Thus FIG. 5 represents the voltage as measured across the resistance 60, namely, $V_1$ equals $(I_1 \text{ plus } I_2)R_1$. FIG. 6 represents the voltage across the resistor 64, namely $V_2$ equals the current $I_3$ in lead 62 times the value of the resistor 64. At a balanced condition, the output is zero voltage due to the counter-balancing or cancelling of the conditions represented in FIGS. 5 and 6.

Figure 8:
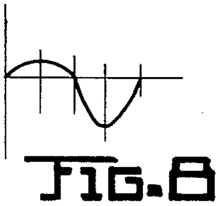
FIGS. 8, 9 and 10 illustrate the wave form of the output of the system at different points thereof in one type of unbalance of the system.
Figure 9:
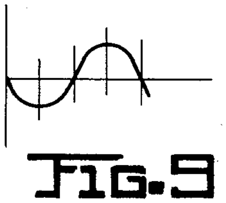
Figure 10:
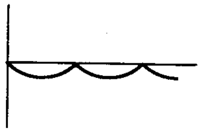

When the system is out of balance and the current flowing through resistor 60 has a non-symmetrical wave form, the output measured at output leads 68 and 70 across the resistors 60 and 64 is a pulsating direct current. FIGS. 8, 9 and 10 illustrate the condition which results when the impedance in coils 26 and 42 is greater than the impedance in coils 28 and 44. Thus FIG. 8 represents schematically the voltage as measured across the resistor 60, namely, $V_1$ equals $(I_1 \text{ plus } I_2)R_1$. FIG. 9 illustrates the voltage as measured across resistor 64, wherein $V_2$ equals $I_3$ times the resistance in resistor 64. The difference in these two voltages, as diagrammatically illustrated in FIGS. 8 and 9, produces a pulsating direct current as illustrated in FIG. 10, which is the sum of the currents illustrated in FIGS. 8 and 9.

Figure 11:
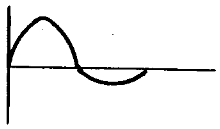
FIGS. 11, 12 and 13 illustrate the wave form of the output of the system in another type of unbalance of the system.
Figure 12:
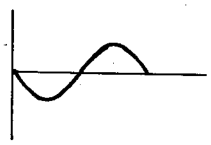
Figure 13:
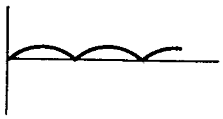

A similar but opposite condition is illustrated in FIGS. 11, 12 and 13 for the case in which the sum of the impedances of coils 26 and 42 is less than the sum of the impedances of the coils 28 and 44. FIG. 11 represents the voltage as measured across the resistor 60, namely, $V_1$ equals $(I_1 \text{ plus } I_2)R_1$. FIG. 12 represents for this condition the voltage across the resistor 64, as previously explained. FIG. 13 represents the sum of voltages as measured across the two resistors 60 and 64 which is a pulsating direct current but of opposite phase than the current as illustrated in FIG. 10 resulting from the opposite type of unbalance of the system.

If resistor 64 is adjusted so that the product of the resistance thereof and the current $I_3$ in lead 63 equals the product of resistance of resistor 60 and the sum of the currents $I_1$ and $I_2$ after the transmission lines are installed, then the system will be independent of supply line voltage variations since the sum of the currents $I_1$ and $I_2$ of the system and the current $I_3$ in line 62 associated with reference impedance 66 will change in the same proportion upon unbalance. Under such conditions, variations in supply voltage will affect the sensitivity of the system only when the system is used to drive a servo pulsating system, as illustrated in FIG. 1, which acts to reposition the armature 56 in a rebalancing manner.

This system can be operated at a relatively high voltage level, and, when operated at such voltage level, the rectifiers 32, 36, 52 and 48 will operate above their threshold voltage point.

One important characteristic of the system is that, by proper design, changes in the resistance of the transmission lines 16 and 22 in response to changes in ambient temperature can be held to a second order effect. This is accomplished by providing the coils 26, 28, 42 and 44 of such impedance as to exceed the applicable transmission line resistance.

Another important characteristic of the system is that the opposing relation of the coils 26 and 28 of the transmitter with respect to the coils 42 and 44 of the receiver, respectively, prevents changes in the ambient temperature of either the transmitter or the receiver from changing the wave form symmetry and balance. An important consideration leading to this result is the fact that coils 26 and 28 are mounted upon the same bobbin and likewise coils 42 and 44 are mounted upon the same bobbin.

Where a servo unit is employed for rebalancing purposes, as shown in FIG. 1, it will be understood that the output of the leads 68 and 70 can be applied to an amplifier (not shown) or to any suitable detector whose output will actuate the rebalancing drive. This rebalancing drive may be effected through other means than a motor, for example, it may be effected through a solenoid (not shown) for the purpose of positioning the armature core 56 proportionally to the position of the input core of armature 40.

Figure 14:
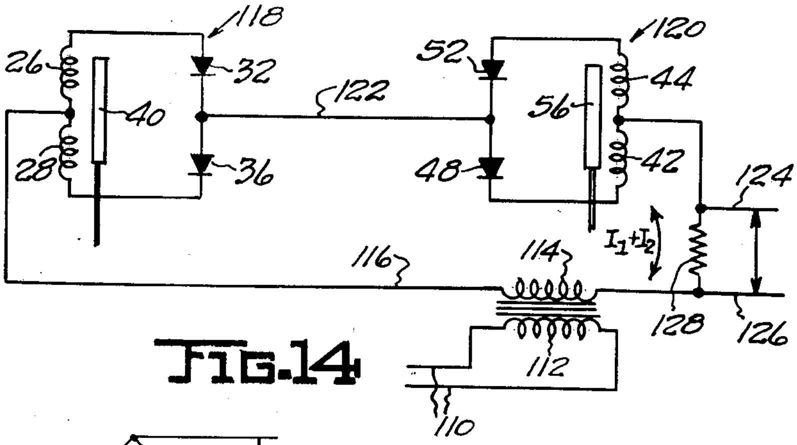
FIG. 14 is a schematic or diagrammatic view of the system illustrating another embodiment of the invention.

Another embodiment of the invention is illustrated in FIG. 14, wherein power supply leads 110 have the primary 112 of a transformer interposed therein. Secondary 114 of the transformer is interposed in a transmission line 116 which extends between a transmitter unit 118 and a receiver unit 120. A second transmission line 122 connects the transmitter unit 118 and the receiver unit 120. The transmitter unit 118 will preferably be similar to the transmitter unit 18 and the receiver unit 120 will preferably be similar to the receiver unit 20 previously described, and similar parts will bear the same reference numerals as are employed in FIG. 1. The output leads 124 and 126 of the circuit are connected, respectively, with the receiver unit 120 and the transformer secondary unit 114. A resistor 128 is connected across the output leads 124 and 126.

In the circuit illustrated in FIG. 14, (the voltage across the resistor 128 is measured as a ratio of $RI_1$ to $RI_2$. Since at balance, $R_1$ equals $R_2$, the ratio will be unity. For any unbalance, the ratio will increase or decrease from unity. In this circuit the output ratio is completely independent of variations in transmission line resistance and of ambient temperature variations. Furthermore, the output ratio can be measured directly by use of a suitable ratio measure (not shown). Such ratio meters may operate from a synchronized chopper input, as well understood in the art, in which the two half-cycles are compared to each other with subsequent lineal amplification, or by means of a ratio meter (not shown) of the type having moving coils positioned in opposition in a fixed magnetic field.

Figure 15:
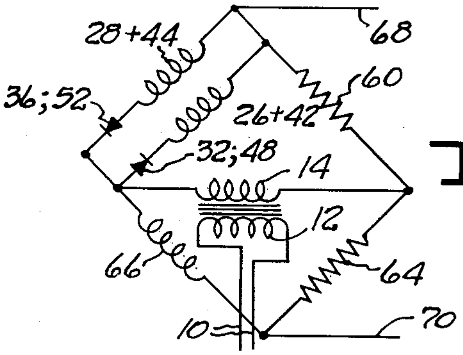
FIG. 15 is a schematic or diagrammatic view illustrating still another embodiment of the invention.

The circuits entailing the transmitter units and the receiver units can be treated or arranged to be connected together in a Wheatstone bridge circuit. Such an arrangement is shown schematically in FIG. 15. FIG. 15 will be treated as an equivalent circuit to the circuit shown in FIG. 1 and the reference numerals applied thereto will be those utilized in FIG. 1. Thus input lead 10 has transformer primary 12 connected thereto and transformer secondary 14 is connected across a bridge circuit. One leg of the bridge circuit contains resistor 60, another leg contains resistor 64, and a third leg thereof contains the reference impedance 66. The components of the transmiter and receiver units are connected across the remaining leg of the bridge in parallel relation. Thus, in one parallel branch or part of the Wheatstone bridge are interposed the impedance of the coils 26 and 42 and the rectifying action of the rectifiers 32 and 48. In the other parallel branch in the remaining leg of the bridge are interposed the impedance of the coils 28 and 44 and the rectifying effect of the rectifiers 36 and 52. The output lead 68 is connected to the bridge circuit between the resistor 60 and the leads of the transmitting and receiver units, while the output lead 70 is connected to the bridge circuit between the resistor 64 and the reference impedance 66. It will be understood that a detector or amplifier (not shown) will be connected across the leads 68, 70.

In all forms or embodiments, one characteristic of the operation of the device is that upon a voltage drop the resultant output voltage also drops, and the output voltage drop is proportional to the voltage drop of the supply. However, this voltage drop does not change the balance or the null point of the system. Hence only sensitivity varies with voltage variations in the supply, but no change of the span of the system or of the zero point occurs in a null balance servo system. Also, a characteristic of all forms of the invention is operation of the system at a voltage above the threshold voltage point of the rectifier. This is essential to avoid unbalance or distortion due to rectifier threshold sensitivity characteristics.

While the preferred embodiments of the invention have been illustrated and described, it will be understood that changes in the system may be made within the scope of the appended claims without departing from the spirit of the invention.

I claim:

1. A signal transmission system comprising a transmitting unit; a receiving unit, said units being similar and each including a loop circuit having a pair of series-connected similar coils mounted on a common bobbin and subject to the influence of a shiftable armature, and a pair of series-connected rectifiers; a transmission line connecting said units and tapped to each unit between the coils thereof, a second transmission line connecting said units and tapped to each unit between the rectifiers thereof; one rectifier of each unit regulating current flow in one direction relative to one coil and the other rectifier in each unit regulating current flow in the other direction relative to the other coil, and means for detecting unbalance of said units.

2. A signal transmission system comprising a transmitting unit; a receiving unit; said units being similar and each including a loop circuit having a pair of series-connected similar coils mounted on a common bobbin and subject to the influence of a shiftable armature, and a pair of similar connected rectifiers each limiting the flow of current in one coil to a direction opposite current flow in the other coil; a pair of transmission lines connecting said units; and means for detecting unbalance of said units.

3. A signal transmission system comprising a transmitting unit; a receiving unit; said units being similar and each including a loop circuit having a pair of series-connected similar coils mounted on a common bobbin and subject to the influence of a shiftable armature, and a pair of similar connected rectifiers each limiting the flow of current in one coil to a direction opposite current flow in the other coil; a pair of transmission lines connecting said units; and means for detecting unbalance of said units; said system having output leads, and a resistance connected across said output leads.

4. A signal system comprising a transmitting unit; a receiving unit; said units being similar and each including a circuit having a pair of similar impedances, rectifying means for directing current flowing in said circuit in one direction through one impedance and current flowing in the other direction through the other impedance, and shiftable means for simultaneously and oppositely varying said impedances; a pair of conductors connecting said units; an alternating current supply; and means for detecting unbalance of said units.

5. A signal system comprising a transmitting unit; a receiving unit; said units being similar and each including a circuit having a pair of similar impedances, means for directing current flowing in said circuit in one direction through one impedance and current flowing in the other direction through the other impedance, and suitable means for simultaneously and oppositely varying said impedances; a pair of transmission lines connecting said units; an alternating current supply; and means for detecting unbalance of said units; the impedances of each unit constituting a pair of coils wound on a common bobbin, the shiftable means of each unit constituting an armature juxtaposed to both coils of that unit and shiftable parallel to the axis of said bobbin.

6. A signal system comprising a transmitting unit; a receiving unit; said units being similar and each including a circuit having a pair of similar impedances, means for directing current flowing in said circuit in one direction through one impedance and current flowing in the other direction through the other impedance, and suitable means for simultaneously and oppositely varying said impedances; a pair of transmission lines connecting said units; an alternating current supply; and means for detecting the unbalance of said units; said system having outlet leads; and a resistor connecting said outlet leads.

7. A signal system comprising a transmitting unit; a receiving unit, said units being similar and each including a circuit having a pair of similar impedances, rectifying means for directing current flowing in said circuit in one direction through one impedance and current flowing in the other direction through the other impedance, and suitable means for simultaneously and oppositely varying said impedances; a pair of conductors connecting said units; an alternating current supply; and means for detecting the unbalance of said units; means responsive to said detecting means upon unbalance of said units for moving the shiftable impedance varying means of said receiver in a direction and to an extent to rebalance said units.

8. A signal system comprising a transmitting unit; a receiving unit; said units being similar and each including a circuit having a pair of similar impedances, rectifying means for directing current flowing in said circuit in one direction through one impedance and current flowing in the other direction through the other impedance, and suitable means for simultaneously and oppositely varying said impedances; a pair of conductors connecting said units; an alternating current supply; means for detecting the unbalance of said units; a reversible motor responsive to said detecting means; and means actuated by said motor for positioning the shiftable means of said receiving unit.

9. A signal system comprising a transmitting unit; a receiving unit; said units being similar and each including a circuit having a pair of similar impedances, rectifying means for directing current flowing in said circuit in one direction through one impedance and current flowing in the other direction through the other impedance, and suitable means for simultaneously and oppositely varying said impedances; a pair of conductors connecting said units; an alternating current supply; means for detecting the unbalance of said units, and a reference impedance associated with said detecting means.

10. A signal system comprising a transmitting unit; a receiving unit; said units being similar and each including a circuit having a pair of similar impedances, rectifying means for directing current flowing in said circuit in one direction through one impedance and current flowing in the other direction through the other impedance, and suitable means for simultaneously and oppositely varying said impedances; a pair of conductors connecting said units; an alternating current supply; and means for detecting the unbalance of said units; said system constituting a Wheatstone bridge circuit having one leg consisting of electrically parallel portions, each of said parallel bridge portions including an impedance of both of said units.

11. A signal transmitting system comprising an alternating current supply; a transmission line connected to said supply and to an outlet; a transmitting unit connected to said line; a receiving unit; a second transmission line connecting said units; a second outlet connected to said receiving unit; a resistance connecting said outlets; said units being similar and each unit including a circuit having a pair of similar impedances, shiftable means for simultaneously and oppositely varying said impedances, and means directing current flowing in one direction in said circuit through one impedance and directing current flow in opposite direction through the other impedance; and means for detecting unbalance of said units.

12. A signal transmitting system comprising an alternating current supply; a transmission line connected to said supply and to an outlet; a transmitting unit connected to said line; a receiving unit; a second transmission line connecting said units; a second outlet connected to said receiving unit; a resistance connecting said outlets; said units being similar and each unit including a circuit having a pair of similar impedances, shiftable means for simultaneously and oppositely varying said impedances, and means directing current flowing in one direction in said circuit through one impedance and directing current flow in opposite direction through the other impedance; and means for detecting unbalance of said units; said resistance constituting two similar resistors in series, said first line being connected between said resistor.

13. A signal transmitting system comprising an alternating current supply; a transmission line connected to said supply and to an outlet; a transmitting unit connected to said line; a receiving unit; a second transmission line connecting said units; a second outlet connected to said receiving unit; a resistance connecting said outlets; said units being similar and each unit including a circuit having a pair of similar impedances, shiftable means for simultaneously and oppositely varying said impedances, and means directing current flowing in one direction in said circuit through one impedance and directing current flow in opposite direction through the other impedance; means for detecting unbalance of said units; and means responsive to said detecting means for moving said shiftable impedance-varying means of said receiving unit to restore said units to balance.

14. A signal transmitting system comprising an alternating current supply; a transmission line connected to said supply and to an outlet; a transmitting unit connected to said line; a receiving unit; a second transmission line connecting said units; a second outlet connected to said receiving unit; a resistance connecting said outlets; said units being similar and each unit including a circuit having a pair of similar impedances, shiftable means for simultaneously and oppositely varying said impedances, and means directing current flowing in one direction in said circuit through one impedance and directing current flow in opposite direction through the other impedance; means for detecting unbalance of said units; said resistance constituting two similar resistors in series; said first line being connected between said resistors; and a reference impedance connected to said first outlet and said first line.

15. A signal transmitting system comprising an alternating current supply; a transmission line connected to said supply and to an outlet; a transmitting unit connected to said line; a receiving unit; a second transmission line connecting said units; a second outlet connected to said receiving unit; a resistance connecting said outlets; said units being similar and each unit including a circuit having a pair of similar impedances, shiftable means for simultaneously and oppositely varying said impedances, and means directing current flowing in one direction in said circuit through one impedance and directing current flow in opposite direction through the other impedance; means for detecting unbalance of said units, said resistance constituting two similar resistors in series, said first line being connected between said resistors; and a reference impedance connected to said first outlet and said first line, said system constituting a Wheatstone bridge wherein said resistors and said reference impedance are interposed in three legs and parallel leads constitute a fourth leg, one of said parallel leads containing the impedance of both units in which current flows in one direction and the other parallel lead containing the impedance of both units in which current flows in the opposite direction.

16. A signal system comprising a transmitting unit; a receiving unit; a pair of transmission lines connecting said units; an alternating current supply; means for detecting unbalance of said units; said units being similar and each including a circuit having a pair of similar coils connected in series, a pair of rectifiers and a magnetic core for simultaneously and oppositely varying the impedance of said coils, said rectifiers directing current flowing in said circuit in one direction through one coil and directing current flowing in the opposite direction through the other coil; and means controlling voltage level in the system above the threshold voltage points of the rectifiers.

17. A signal system comprising a transmitting unit; a receiving unit; a pair of transmission lines connecting said units; an alternating current supply; means for detecting unbalance of said units; said units being similar and each including a circuit having a pair of similar coils connected in series, a pair of rectifiers and a magnetic core for simultaneously and oppositely varying the impedance of said coils, said rectifiers directing current flowing in said circuit in one direction through one coil and directing current flowing in the opposite direction through the other coil; the impedances of the transmitter and receiver coils being higher than resistance of the transmission lines.

18. A signal system comprising a transmitting unit; a receiving unit; a pair of conductors connecting said units; an alternating current supply; and means for detecting unbalance of said units; said units being similar and each including a pair of similar impedances arranged in parallel electrically; rectifying means for unidirectionally and oppositely controlling flow of current in said impedances, and shiftable means associated with both impedances to vary them simultaneously and oppositely.

19. A signal system comprising a transmitting unit; a receiving unit; a pair of transmission lines connecting said units; an alternating current supply; and means for detecting unbalance of said units; said units being similar and each including a pair of similar inductance coils arranged in parallel electrically and wound on a common bobbin, a shiftable core to vary the induction of said coils simultaneously and oppositely, and means for controlling flow of current in said coils unidirectionally and oppositely.

References Cited in the file of this patent

UNITED STATES PATENTS

| | | |
|---|---|---|
| 2,246,686 | Jones | June 24, 1941 |
| 2,363,690 | Rozek | Nov. 28, 1944 |
| 2,692,357 | Nilson | Oct. 19, 1954 |
| 2,794,971 | Hornfeck | June 4, 1957 |